(12) United States Patent
Patil et al.

(10) Patent No.: US 12,539,501 B2
(45) Date of Patent: Feb. 3, 2026

(54) AMMONIUM NITRATE REACTOR WITH STATIC MIXER

(71) Applicant: Stamicarbon B.V., Sittard (NL)

(72) Inventors: Rahul Patil, Maastricht (NL); Lambertus Wilhelmus Gevers, Merkelbeek (NL); Solomon Assefa Wassie, Eindhoven (NL); Michail Tsopozidis, Maastricht (NL)

(73) Assignee: Stamicarbon B.V., Sittard (NL)

( * ) Notice: Subject to any disclaimer, the term of this patent is extended or adjusted under 35 U.S.C. 154(b) by 0 days.

(21) Appl. No.: 18/868,096

(22) PCT Filed: Sep. 9, 2024

(86) PCT No.: PCT/NL2024/050491
§ 371 (c)(1),
(2) Date: Nov. 21, 2024

(87) PCT Pub. No.: WO2025/053759
PCT Pub. Date: Mar. 13, 2025

(65) Prior Publication Data
US 2025/0170548 A1 May 29, 2025

(30) Foreign Application Priority Data
Sep. 8, 2023 (EP) .................... 23196194

(51) Int. Cl.
*B01J 19/24* (2006.01)
*B01J 4/00* (2006.01)
*B01J 10/00* (2006.01)
*B01J 19/00* (2006.01)
*C01C 1/18* (2006.01)

(52) U.S. Cl.
CPC ............. *B01J 19/24* (2013.01); *B01J 4/004* (2013.01); *B01J 10/00* (2013.01); *B01J 19/002* (2013.01); *C01C 1/185* (2013.01); *B01J 2204/002* (2013.01); *B01J 2219/00162* (2013.01)

(58) Field of Classification Search
CPC ... B01J 19/24; B01J 4/004; B01J 10/00; B01J 19/002; C01C 1/185
See application file for complete search history.

(56) References Cited

U.S. PATENT DOCUMENTS 4,927,617 A    5/1990   Villard et al.

FOREIGN PATENT DOCUMENTS

| AU | 654632 B1 | 11/1994 | |
|---|---|---|---|
| CN | 114432977 A | * 5/2022 | ............. B01J 10/00 |
| WO | WO 2018/131559 A1 | * 7/2018 | ............. A23B 2/805 |

OTHER PUBLICATIONS

Eben A et al., "Ammonium nitrate production and operational experience", Nitrogen and Methanol, Sep. 1, 1998, pp. 25, 27-30, 32, No. 235, British Sulphur Publishing, London, GB.

(Continued)

*Primary Examiner* — Wayne A Langel
(74) *Attorney, Agent, or Firm* — Leason Ellis LLP

(57) ABSTRACT

The disclosure pertains to an ammonium nitrate reactor with a first type static mixer in the mixing zone upstream of the tube bundle and/or a second type static mixer downstream of the tube bundle.

24 Claims, 4 Drawing Sheets

(56) References Cited

OTHER PUBLICATIONS

G.R. Maxwell, "Ammonium Nitrate" Synthetic Nitrogen Products (2005), p. 251-265, Springer, Boston, MA, doi: 10.1007/0-306-48639-3_10.
International Search Report and Written Opinion mailed Nov. 19, 2024 for the corresponding PCT International Patent Application No. PCT/NL2024/050491(13 pages).
Zapp et al., "Ammonium Compounds", Ullmann's Encyclopedia of Industrial Chemistry, chapter Ammonium Compounds, 2012, doi:10.1002/14356007.a02_243.

* cited by examiner

A   B

A   B

AMMONIUM NITRATE REACTOR WITH STATIC MIXER

CROSS-REFERENCE TO RELATED PATENT APPLICATIONS

This application is a U.S. National Stage Application under 35 U.S.C. § 371 of International Patent Application No. PCT/NL2024/050491, filed Sep. 9, 2024, which claims the benefit of priority to European Patent Application number EP 23196194.7, filed Sep. 8, 2023, both of which are hereby incorporated by reference as if set forth in their respective entireties herein.

FIELD

Embodiments of the invention pertain to a reactor and process for reacting aqueous nitric acid (NA) with gaseous $NH_3$ to form an ammonium nitrate (AN) solution, with recirculation of a part of the AN solution. Gaseous $NH_3$ is admitted to a mixture of aqueous nitric acid and ammonium nitrate through perforations of tubes.

INTRODUCTION

Ammonia reacts rapidly and completely with nitric acid in aqueous solutions to form AN in an exothermic reaction. In AN production, an amount of AN solution is recycled and serves as a buffer to the reaction heat. The recycle ratio depends on the maximum allowable reaction temperature (for instance, ranging from 125 to 185° C.) and is, for example, in the range 5-40 as mass ratio of recycled solution to AN product purge. Frequently forced flow of the solution is used, i.e. with a pump.

The recycled aqueous ammonium nitrate solution for instance comprises at least 80 wt. % AN, e.g. up to 92 wt. % AN. The feed nitric acid solution contains e.g. about 60 wt. % NA and balance essentially water. Nitric acid is typically produced in an adjacent Ostwald process where $NH_3$ is reacted with $O_2$ to form nitric oxides that are absorbed in an aqueous stream under the formation of nitric acid to give nitric acid aqueous solution. NA concentrations up to 68% (azeotropic mixture) can be reached normally, higher concentrations require special measures.

G. R. Maxwell, Synthetic Nitrogen Products (2005), p. 251-265, chapter Ammonium Nitrate, doi: 10.1007/0-306-48639-3_10 describes various processes and apparatuses for AN production. A further background reference is Ullmann's Encyclopedia of Industrial Chemistry, chapter Ammonium Compounds, 2000, doi: 10.1002/14356007.a02_243.

An example reactor for the production of AN is described in AU654632B1. The described vertical reactor comprises a bottom cone for receiving recycled ammonium nitrate solution, said cone having injection nozzles for introducing aqueous nitric acid for admixture with the recycled ammonium nitrate solution; a premixing zone located adjacent and above said bottom cone and adapted to receive the admixture and initially mix the recycled ammonium nitrate solution and aqueous nitric acid; a final mixing zone located adjacent and above said premixing zone and adapted to receive and homogeneously mix the premixed recycled ammonium nitrate solution and aqueous nitric acid; a downstream tubed chamber located adjacent and above the final mixing zone, said chamber containing a bundle of perforated tubes for introducing the ammonia containing gas for admixture with the mixed recycled ammonium nitrate solution and aqueous nitric acid in a gas-to-liquids admixing zone; and a reaction chamber located adjacent and above the downstream tubed chamber. The reactor internals are arranged in a manner such that the initial liquid mixture passes (typically in an upward direction) through the mixing zone, the final mixing zone, the gas-to-liquids admixing zone provided by the perforated tubes, and the reaction zone. Gaseous ammonia is admitted, under pressure, to the shell space of the tube bundle, which is essentially closed by a bottom and top tube plates (which tube plates may contain minor venting holes). The tubes extend through the tube plates. The tubes are provided with penetration holes and the gaseous $NH_3$ enters through the holes of the tube into the tube sides in the liquid phase. A provision is made for flash evaporation of steam downstream of the reactor. In order to reduce ammonia losses by the flash vapor, the ammonium nitrate solution in the reaction loop is adjusted so as to obtain a small surplus of acid. The document mentions that a sophisticated type of reactor is required to permit a homogenous reaction, a uniform heat distribution over the entire cross-sectional area of the reactor as well as lower nitrogen losses and to deploy suitable materials of construction.

In AU654632B1, downstream of the acid injection device a premixing zone is provided (0.5 to 3 m in length), followed by 1-4 static mixing elements (described as multi-orifice plates, packings, fluid mixers; also referred to as premixing elements). The aim of the static mixer is to optimize the homogeneity of the acid distribution in the mixture. The coefficient of variance should range from 0.01 to 0.5. The finally mixed acidic ammonium nitrate solution enters a multitube reactor bundle (3-200 tubes). The individual tubes (inner diameter 50 to 200 mm) of the bundle have penetration holes diameter 1.5 to 5 mm) arranged in a spiral manner. The pressure inside the reactor bundle is 0.02-2.5 bar higher than the boiling point of the ammonium nitrate solution at the given temperature. Reaction zones, downstream of the tube bundle, followed by a post-mixing element similar to the premixing elements ensure completion of the reaction so that the nitrogen losses are very low during further process steps, for example flashing of the solution.

A first desire is to further reduce the $NH_3$ slippage from the reactor outlet and resulting nitrogen losses and/or corresponding need for purifying treatment of the flash vapor or condensate obtained from this vapor.

Also desired is to have a long lifetime of the tubes, i.e. less frequent replacement.

A further desire in the art is to have good liquid-liquid mixing of the nitric acid solution and the ammonium nitrate solution. The afore-mentioned document Ullmann's mentions that during neutralization, the components are desirably mixed quickly and thoroughly in the reactor to avoid local overheating, losses of nitrogen, and decomposition of ammonium nitrate.

A general desire is to have a conversion of $NH_3$ to NA that is as complete as possible at the outlet of the reaction unit.

A further desire is to have a low pressure drop over the reactor; e.g. in case of forced recirculation of AN solution this reduces energy consumption of the recirculation pump.

SUMMARY

The invention aims to provide ammonium nitrate reactor (neutralizer) with improved, or at least alternative, static mixers upstream and/or downstream of the tube bundle.

The invention pertains in a first aspect to a reaction unit for the production of ammonium nitrate by neutralization of aqueous nitric acid with gaseous $NH_3$, the reaction unit comprising: an inlet zone comprising a first inlet for a stream of recirculated ammonium nitrate solution and a second inlet for the aqueous nitric acid; a mixing zone located downstream of said inlet zone, wherein the mixing zone preferably comprises a first type static mixer adapted to mix the recirculated ammonium nitrate solution with the aqueous nitric acid to form a liquid mixture; a shell-and-tube chamber comprising tube bundle and a shell space wherein the shell space comprises an inlet for gaseous $NH_3$, wherein a tube of the tube bundle has a tube wall, an inlet tube end and an outlet tube end, said tube is configured for receiving the liquid mixture from the mixing zone through the inlet tube end, and said tube comprises perforations in the tube wall to allow gaseous $NH_3$ from the shell space to enter the tube; a reaction zone downstream of the outlet end of the tube, wherein the reaction zone preferably comprises a second type static mixer. Preferably, the first-type static mixer is used, or preferably the second-type static mixer is used, or both the first and the second type static mixers are used. All preferences for the first respectively second-type static mixer apply also for the embodiment having both the first and the second type static mixer.

The preferred first type static mixer in the mixing zone upstream of the tube bundle comprises: a flow-diverting plate which extends in a transversal direction perpendicular to the general liquid flow direction in the mixing zone and wherein in operation liquid impinges on the flow-diverting plate; a first aperture in the flow-diverting plate; a circumferential flange around the first aperture, wherein said flange extends perpendicular to the plate and has a first end that is joined to the plate and an opposite second end; a transversal element, extending substantially parallel to the plate and joined to said second end of the circumferential flange; such that the transversal element and the flange together provide a cup-like structure around the first aperture; wherein the circumferential flange comprises a plurality of second apertures, wherein each second aperture provides a smaller flow area than said first aperture.

The preferably used second type static mixer is provided in the reaction zone and downstream of the outlet tube ends, wherein the reaction zone has a generally vertically upward flow direction, and the second type static mixer comprises: a horizontal gas redistribution plate provided with a liquid passageway, e.g. an aperture, and a gas vent hole, wherein each liquid passageway is provided with a flange extending downward from a perimeter of the liquid passageway, the plate and flanges together providing an interstice configured for collecting gas from the outlet tube ends in a gas layer or cushion (gas cushion) below the gas redistribution plate.

It is noted that the first type static mixer and second static type mixer can be used independently, and also, preferably, in combination.

Embodiments of the disclosure pertain to an ammonium nitrate reactor with a first type static mixer in the mixing zone upstream of the tube bundle and/or a second type static mixer downstream of the tube bundle.

Also provided is a reactor comprising the reaction unit according to the invention (with the first and/or the second type static mixer) and further comprising a gas/liquid separation zone receiving an effluent from the reaction unit, a liquid flow line from said separation zone to an inlet of the reaction unit for recirculation of ammonium nitrate solution to said first inlet of the inlet zone; a gas outlet for gas from the separation zone; and a liquid outlet for product AN solution from the separation zone.

Also provided is a process for the production of ammonium nitrate by neutralization of aqueous nitric acid with gaseous $NH_3$ carried out in a reaction unit according to the invention or a in the reactor according to the invention. Also in the process, the first and/or second static type mixer is used.

Figure 1:
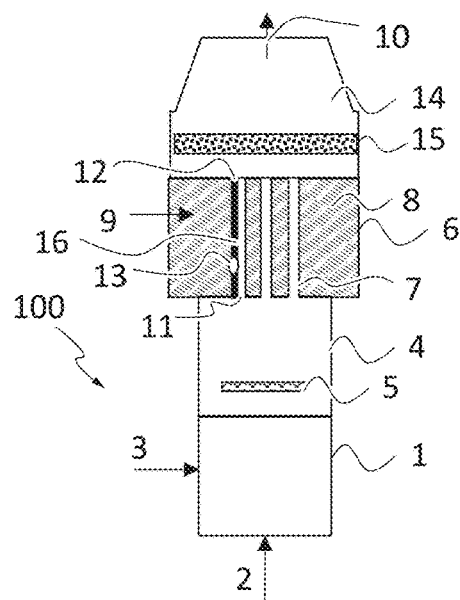
FIG. 1 schematically illustrates schematically illustrates an example reaction unit according to the invention.

Any embodiments illustrated in the figures are examples only and do not limit the invention.

DETAILED DESCRIPTION

An aspect of the invention pertains to a reaction unit for the production of ammonium nitrate by neutralization of aqueous nitric acid with gaseous $NH_3$; and to a process of AN production carried out in the reaction unit. Preferences and details mentioned for the operation of the reaction unit apply also to the process. The process can also be described as a method of operating the reactor.

The reaction unit comprises, in the flow direction for liquid, subsequently, preferably consecutively, an inlet zone, a mixing zone, a shell-and-tube chamber, and a reaction zone. The shell-and-tube chamber comprises a tube bundle. The reaction unit is configured for liquid flow from the inlet zone to the mixing zone and from the mixing zone to the reaction zone through the tubes of the tube bundle.

The invention also provides a reactor comprising the reaction unit, a gas/liquid separation zone receiving an effluent from the reaction unit, and a liquid flow line from said separation zone to an inlet of the reaction unit for recirculation of AN solution, in particular to said first inlet of the inlet zone. The reactor comprises a gas outlet for gas from the separation zone and a liquid outlet for product AN solution from the separation zone.

The reactor typically comprises purge means, e.g. a liquid dividing zone, configured for dividing liquid from the gas/liquid separation zone into at least a first part that is purged and obtained as AN product solution and a second part that is recirculated to the inlet zone. In an embodiment, a single vessel having a gas outlet, an inlet for an effluent from the reaction unit, and a first liquid outlet, and a second liquid outlet, the second liquid outlet being in liquid connection with the first inlet of the inlet zone, provides for both the gas/liquid separation zone and the liquid dividing zone. The liquid dividing zone is e.g. branched piping.

The reactor accordingly has a loop design for circulating ammonium nitrate solution used as a diluent, e.g. a solvent, for the neutralization reaction. In operation, the mass ratio circulated AN solution to purged product AN is usually above 5, preferably at least 10, e.g. at least 20, and e.g. less than 50 or less than 30. In operation, the recirculated AN solution for example contains preferably at least 80 wt. % AN, e.g. from 85 to 92 wt. % AN; and preferably comprises at least 7 wt. % water. If the AN concentration is higher, the water content may be too low and crystallization of AN could occur.

In operation, the aqueous NA feed (at the inlet of the inlet zone) contains e.g. preferably at least 50 wt. % or at least 60 wt. % NA, usually up to 68 wt. % NA and typically at least 30 wt. % water. In operation, the liquid at the tube inlets contains, based on the total liquid, e.g. 3 to 5 wt. % NA. Thereby the feed NA is diluted by the recirculated AN solution, which is important for safe and stable operation of the neutralization reaction.

In operation, the aqueous nitric acid is usually obtained from a nitric acid plant wherein $NH_3$ is reacted with $O_2$ to give nitric oxides which are absorbed in an aqueous stream under the formation of nitric acid. In an embodiment, the process also includes forming the nitric acid feed in this way.

Generally, the product AN solution is desired to have a low water concentration. For instance if the AN solution is used for making solid AN product, e.g. by granulation, an essentially anhydrous AN melt is to be fed to the granulator, requiring evaporation of water from the AN product solution. Also in an embodiment wherein the AN solution is used for making UAN liquid fertilizer (urea ammonium nitrate solution comprising typically less than 40 wt. % water or less than 30 wt. % water, usually 20-30 wt. % water) by combining with a urea-containing stream, a low water content of the AN solution is desirable so that the urea-containing stream may be an aqueous urea solution. Production of the aqueous urea solution with higher water content requires less water evaporation in the urea plant which is advantageous. Hence, it is advantageous if the feed aqueous NA comprises at least 55 wt. % NA. However, the NA concentration of the liquid mixture at the tube inlets should be lower for safely conducting the reaction with $NH_3$.

The gas/liquid separation zone is usually based on gravity separation, with liquid flowing down and gas flowing up. The reactor has a gas outlet for vapor from the gas/liquid separation. In operation, the water introduced into the reaction unit as part of the aqueous nitric acid partly vaporizes upstream or in the gas/liquid separation zone and the withdrawal of steam through the gas outlet of the reactor is advantageous for heat management of the exothermic reaction.

The reactor typically comprises a scrubbing zone for scrubbing the vapor from the gas/liquid separation zone for removal of entrained AN (i.e. entrained droplets); e.g. a scrubbing zone with trays and having an inlet for an aqueous scrub liquid in an upper part of the scrubbing zone. Typically, the gas/liquid separation zone receives spent scrub liquid from the scrubbing zone; in an example embodiment the scrubbing zone is arrange directly above the gas/liquid separation zone in an unseparated vessel comprising the separation zone and the scrubbing zone. The vessel e.g. has a top outlet for gas, a bottom outlet for purged product solution, a bottom outlet for circulated solution, and a fluid inlet located vertically between the gas outlet and liquid outlets. The fluid inlet is e.g. a liquid inlet with downstream a restriction orifice for depressurizing the liquid in the vessel. In an embodiment, the vessel has a single liquid outlet and the liquid divider is arranged downstream of the liquid outlet of the vessel. In an embodiment, the vessel comprises at least two liquid outlets and the vessel provides the liquid divider. The liquid divider can be provided e.g. by an overflow weir to the purge product outlet. The liquid divider accordingly can be a part of the vessel and can be referred to as a purge product outlet.

Suitably, the excess NA at the outlet of the reaction zone and at the liquid divider can be neutralized by adding some $NH_3$ (vapor or liquid or solution), e.g. when mixed with urea solution containing some traces $NH_3$ to form UAN.

The reactor is preferably forced circulation reactor, with in operation a higher pressure in the reaction unit than in the gas/liquid separation zone. The reactor preferably comprises a pressure reduction means, e.g. a restriction orifice or a valve, preferably a restriction orifice, between the reaction zone and the gas/liquid separation zone; and a pump in the liquid flow line for recirculated AN solution. Preferably, the reaction unit comprises the pressure reduction means in the reaction zone, preferably at or directly upstream of the outlet of the reaction zone.

Preferably, the pressure at the outlet of the reaction unit and/or at the inlet of the pressure reducing means (restriction orifice) is above 1.0 bara, e.g. up to 2 bara, e.g. about 1.5 bara. Preferably, the pressure in the gas/liquid separation zone is below 1.0 bara, e.g. at least 0.20 bara, such as 0.25 bara to 0.90 bara.

Preferably, the pressure reduction of the restriction orifice is at least 0.5 bara, or at least 1.0 bara. A sufficient pressure reduction may contribute to sufficient (evaporative) cooling of the circulating AN cooling. A too low pressure in the separator may cause AN crystallization issues.

The preferred flash evaporation of water from the effluent downstream of the pressure reduction means provides for cooling of the liquid and the relatively cold recirculated ammonium nitrate solution contributes to heat management in the reaction zone. Usually, the vapor from the reactor is condensed at least in part in a condenser to give aqueous condensate and it is desired in the art that the resulting condensate has low contaminations in order to permit flexible use of the condensate in the plant. Generally, the $NH_3$ content of any gaseous emissions from the plant should be very low to meet environmental regulations.

A background reference for this general type of reactor is G. R. Maxwell, Synthetic Nitrogen Products (2005), chapter Ammonium Nitrate, FIG. 10.2.

FIG. 1 schematically illustrates an example reaction unit according to the invention. Even though details of the reaction unit will now be discussed using the reference numerals in FIG. 1, the reaction unit is not limited to the illustrated embodiment.

The reaction unit (100) comprises, in series in the flow direction for liquid, an inlet zone (1); a mixing zone (4); a shell-and-tube chamber (6), and a reaction zone (14). The inlet zone comprises a first inlet (2) for a stream of recirculated ammonium nitrate solution and a second inlet (3) for the aqueous nitric acid. The mixing zone (4) is located adjacent to, or downstream of, said inlet zone and comprises preferably a first type static mixer (5), which static mixer is adapted to mix the recirculated ammonium nitrate solution with the aqueous nitric acid to form a liquid mixture. The shell-and-tube chamber (6) comprises a tube bundle (7) and a shell space (8). The shell space comprises an inlet (9) for gaseous $NH_3$. A tube, preferably each tube, of the tube bundle has a tube wall (16), an inlet tube end (11) and an outlet tube end (12). The tube is configured for receiving a part of the liquid mixture from the mixing zone through the inlet tube end, and comprises perforations (13) in the tube wall to allow gaseous $NH_3$ from the shell space to enter the tube. The reaction zone (14) is arranged downstream of the outlet end of the tube. The reaction zone comprises preferably a second type static mixer (15) and has an outlet (10) downstream of the second type static mixer.

The reaction unit is of the type with a shell-and-tube chamber comprising a tube bundle, that is usually a vertical tube bundle, and a shell space (shell side space). In operation, gaseous $NH_3$ is provided in the shell space, a mixture of the aqueous nitric acid and recirculating ammonium nitrate solution is provided in the tubes, generally flowing upwards in the tubes, and the gaseous $NH_3$ is admitted to the nitric acid mixture by perforations in the tubes. In operation, the $NH_3$ may react with nitric acid already in the tubes. The shell-and-tube chamber is for example, but without limitation, as described in AU654632B1.

The tubes of the tube bundle are straight tubes, with the length of the tubes defining the axial direction and the radial plane of the chamber being perpendicular to the tubes. The number of tubes is for instance at least 5 tubes (100 metric tons AN per day), e.g. about 100 tubes or about 200 tubes (4000 metric tons per day).

The tubes are spaced apart from each other in the radial plane. The shell-and-tube chamber is delimited by an upper tube plate and a lower tube plate (also known as tube sheet). The tube bundle comprises tubes that individually protrude with their respective ends through the upper tube sheet and the lower tube sheet. The lower tube sheet delimits the shell space from a mixing zone that is arranged upstream, in flow direction for the liquids, of the tubes.

In an example embodiment, the tubes have an inner diameter of about 7 cm and/or a length of 50 to 100 cm. The tubes are e.g. manufactured of Ti. Each tube for instance comprises 10 to 30 holes as perforations of the tube wall. The distribution of the holes over the tube and the size of the holes is e.g., without limitation, as in AU654632B1.

In operation, $NH_3$ is supplied to the shell space at a pressure higher than the AN circulation pressure, e.g. a pressure that is at least 0.25 bara higher than the AN circulation pressure, and with e.g. at least 99 vol. % $NH_3$. In operation, the pressure inside the tube bundle is preferably higher, e.g. at least 0.02 bar higher and/or up to 2.5 bar higher, than the boiling point pressure of the ammonium nitrate solution at the temperature inside the tube bundle. This pressure minimizes steam formation in the reaction unit thereby reducing the formation of a gas phase in the reaction zone and contributes to complete conversion of $NH_3$ into AN in the liquid phase in the reaction zone. This advantageously provides for a low $NH_3$ content and low AN dust content of the gas from the gas/liquid separation. Preferably, in operation the reaction unit receives excess nitric acid feed to $NH_3$, i.e. in a molar ratio of more than exactly 1, and for instance is operated with at the reaction unit outlet pH of 1.0 to 2.0, preferably about 1.5 to about 2.0; and/or with about 0.07 wt. % NA, usually less than 0.10 wt. % NA in the total fluid at the reaction unit outlet calculated on the basis of complete conversion of the $NH_3$ feed. The liquid mixture, at the inlets of the tubes, contains e.g. 3-4 wt. % NA based on total liquids.

The scrub liquid may contain dissolved ammonia to reduce the excess NA in part; optionally the product AN solution is subjected to neutralization with ammonia solution downstream of the purge.

For each zone independently, the radial direction is perpendicular to the flow direction, i.e. horizontal if the flow flows vertical in the zone.

The reaction unit comprises an inlet zone, mixing zone, shell-and-tube chamber, and reaction zone, that are in fluid flow connection to each other. The zones may also be referred to as chambers, and are preferably each independently delimited by a suitable shell or wall. Typically, there are no dividers between the zones of the reaction unit.

Upstream of the shell-and-tube chamber, the aqueous nitric acid and ammonium nitrate solution are received in the inlet zone and mixed in the mixing zone.

The recycled AN solution at the reaction unit inlet has a temperature of e.g. about 100 to 120° C. The aqueous nitric acid for example has a temperature of e.g. 20 to 50° C. at the inlet of the reaction unit.

The inlet zone preferably comprises an inlet for the circulating AN solution and downstream thereof, for AN solution, distributing means for introducing nitric acid into the inlet zone. Examples of possible distributing means for the nitric acid include nozzles and spargers.

In an non-limiting example embodiment, the inlet zone comprises, as the distributing means, injection nozzles for aqueous nitric acid arranged around the perimeter of the zone. An example of such an inlet zone is described in AU654632B1.

In another embodiment, which is preferred, the inlet zone comprises, as the distributing means, a sparger for nitric acid. The sparger, i.e. conduit or vessel, extends for instance from an opening in the wall of the inlet zone radially (or horizontally) into the inlet zone and comprises a plurality of openings for nitric acid that are distributed and spaced apart from each other in the radial plane.

The inlet zone optionally comprises a conical part, in particular optionally the inlet zone is a bottom cone of the reaction unit, as discussed in AU654632B1. Other designs are however also possible.

In some embodiments of the invention, a special type of static mixer is used in the mixing zone.

In other embodiments, the mixing zone comprises one or more static mixers; e.g. two or more static mixers in series. Example static mixers for these embodiments are described in AU654632B1 without being limited thereto.

In a preferred embodiment, the operation of the inlet zone, mixing zone and shell-and-tube chamber, each independently, is not dependent on volumetric mass density differences between the fluids, and hence not dependent on vertical upward flow of the liquid. In other words, any flow direction relative to gravity can be used in these zones, in principle.

Preferably, but without limitation, the liquid flows generally vertically upward, with respect to gravity, through (each independently) the inlet zone, mixing zone, and tubes in operation. Upward flow in the tubes is especially preferred because of the admitted gas. Other flow directions are also possible.

The reaction unit is preferably comprised in the reactor as described, with the reactor further comprising the gas/liquid separation zone and the liquid flow line for circulating AN solution.

In an example embodiment the reaction unit comprises a single vessel, comprising the inlet zone, mixing zone, shell-and-tube chamber and reaction zone, for example vertically stacked with from bottom to top subsequently the inlet zone, mixing zone, shell-and-tube chamber and reaction zone. For example, the inlet zone, mixing zone, shell-and-tube chamber and reaction zone are each substantially cylindrical compartments.

The shell-and-tube chamber of the invention (including both the tubes and the shell) usually has a larger radial surface area (area in the cross-section perpendicular to the flow direction) than the mixing zone; in particular the shell preferably has a larger diameter than the mixing zone. Preferably, total radial surface area (flow area) of the tubes is about 100% (e.g. 90 to 110%) of the radial surface area of the mixing zone. A relatively large surface area of the tubes provides for a lower dynamic pressure drop at the tubes.

The presence of other zones between the mentioned zones is not excluded.

Preferably, the reaction unit comprises a diverging (in flow direction), preferably conical, part between the mixing zone and the shell-and-tube chamber, in particular between the mixing zone and the lower tube sheet of the shell-and-tube chamber. The conical part diverges from the mixing zone to the shell-and-tube chamber.

Preferably, the reaction unit comprises a converging (in flow direction), preferably conical part between the shell-and-tube chamber and an outlet of the reaction unit, preferably downstream of the upper tube sheet. The reaction zone may comprise this converging part, or the converging part is downstream or upstream of the reaction zone. The part converges from the shell-and-tube chamber to the outlet. The converging part advantageously is useful for having the preferred single outlet with a restriction orifice.

Obtaining a more complete mixing in the mixing zone is desired as it is important to have a homogeneous mixture at the inlet of the tube bundle. The tube bundle provides a manifold for the liquid. If the mixing is incomplete, in particular if the liquid stream in some zones in the radial plane has a lower concentration of nitric acid, in operation the tubes receiving liquid from these zones have an excess of $NH_3$ which results in unreacted $NH_3$ being present at the outlet end of these tubes. This $NH_3$ is at the downstream end of the individual tube, inside the tube, unable to react with nitric acid as the surrounding liquid in the tube is locally saturated with $NH_3$ and separated by the tube walls from the tubes which contain the corresponding excess of nitric acid. Even if overall a slight excess of nitric acid is used, as is preferred, if no measures are taken between the outlet tube ends and the gas/liquid separation, more particular between the outlet tube ends and the restriction orifice, the unreacted $NH_3$ will exit from the reaction zone effluent at the gas/liquid separation into the vapor stream. This results in a lower AN yield and in contamination of the vapor stream from the gas/liquid separation.

Embodiments of the present invention aim to achieve more complete mixing of the nitric acid and the circulated ammonium nitrate solution upstream of the inlet tube ends. In particular, one or more (first type) static mixers having a particular configuration are provided in the mixing zone upstream of the shell-and-tube chamber in these embodiments of the invention. These embodiments aim to provide an improvement, or at least a high quality alternative or implementation to the pre-mixing elements 12 of AU654632B1 which are located upstream of the shell-and-tube chamber.

Embodiments of the present invention aim to address any disbalance in $NH_3$ and nitric acid content in the tube outlets. In particular, a gas redistribution plate is provided downstream of the shell-and-tube chamber in these embodiments of the invention. These embodiments aim to provide an improvement, or at least a high quality alternative or implementation, to the post-mixing element 12a of AU654632B1 which is located downstream of the shell-and-tube chamber.

In addition to the need to desirably have complete mixing of the liquids at the tube inlets, a particular challenge when mixing the feed aqueous nitric acid with the AN solution in the mixing zone is the corrosivity of the mixture and/or the need to avoid overheating of the liquid mixture and decomposing the ammonium nitrate at early stages. Corrosivity, overheating and decomposition can occur until sufficiently low local NA concentrations are reached, i.e. can occur until the NA is present in liquid with a local NA concentration below some first threshold level. Therefore, fast mixing to sufficiently low, local, NA concentrations is important.

Preferably, the wall of the mixing zone is made of corrosion-resistant steel. In other words, embodiments of the invention advantageously avoid the need to provide the mixing zone wall (or surface of the wall exposed to the mixture) of non-steel corrosion resistant materials which are generally more expensive. Furthermore, a low pressure drop is desired to decrease the energy consumption of the AN solution recirculation pump.

The volumetric flow rate of the ammonium nitrate solution to the aqueous nitric acid received by the reaction zone (AN recycle to NA feed) is preferably at least 5, or at least 10, e.g. up to 30 or up to 20 (as $m^3$ AN solution to $m^3$ aqueous nitric acid per hour).

Furthermore, the mixing should avoid that individual tubes of the shell-and-tube chamber receive liquid with a NA concentration below a second threshold NA concentration that corresponds to a molar ratio of exactly 1 to the $NH_3$ admitted into the individual tube. Therefore, at the downstream end of the mixing zone, and assuming the tubes receiving an equal amount of $NH_3$, all liquid should desirably have a local NA concentration that is at least the second threshold NA concentration. Herein, the second threshold level is lower than the first threshold level.

Hence, the mixing should not only sufficiently disperse the aqueous NA to be present with local NA concentration below the first threshold concentration, but also to more completely disperse the NA to ensure that all parts of the liquid mixture have a local NA concentration of at least the second threshold NA concentration. In some embodiments, each individual tube desirably receives at the tube inlet a liquid with at least 3.0 wt. % NA. The very low reaction zone outlet NA concentration defines a narrow margin in this respect. In particular, the presence of relatively nitric acid poor pockets in the liquid at the inlets of the tubes is desirably avoided. This is particularly challenging considering the high volumetric flow rate of AN recycle solution relative to make-up aqueous NA feed.

In an embodiment, the mixing zone contains a first type static mixer with a plate provided with one or more mixing cups. In an embodiment, the mixing zone contains a helical static mixer downstream of the static mixer with mixing cups; preferably comprises two, or more, helical static mixers in series downstream of the mixing cups static mixer; more preferably with a further static mixer between the two helical static mixer in series. In an embodiment, the mixing zone contains in series, and in the order of the flow direction, a first mixing cup static mixer, a first helical mixer, a second mixing cup static mixer, and a second helical mixer.

Figure 2:
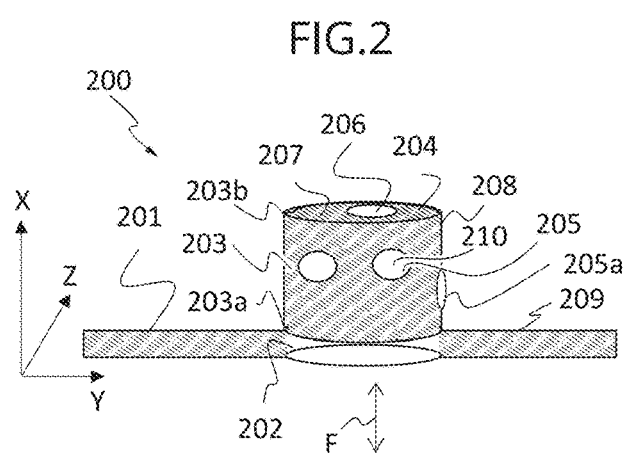
FIG. 2 schematically illustrates a view of an example first type static mixer that is preferably used in the invention.

FIG. 2 schematically illustrates a view of an example first type static mixer that is preferably used in the invention (numbering different than in FIG. 1).

The first type static mixer (200) is preferably arranged in the mixing zone upstream of the tube bundle comprises a flow-diverting plate.

The flow-diverting plate (201), which can also be referred to as a liquid distribution plate, extends in a transversal direction perpendicular to the general liquid flow direction (F) in the mixing zone. The flow direction is illustrated as vertical upward but may have any orientation (with respect to gravity) in practice; the flow is perpendicular to the flow-diverting plate (201). The mixing cup (208) can be upstream or downstream of the flow-diverting plate (201).

The flow-diverting plate comprises one or more first apertures (202) permitting liquid flow through the plate, but is otherwise substantially closed. Hence, in operation liquid impinges on at least some parts of the flow-diverting plate and flows parallel to the plate to the first aperture in the plate. The liquid is the liquid phase received by the first type static mixer, and contains at least two components to be mixed. The liquid may be referred to as a liquid mixture though it is not yet completely mixed. The plate (201) is usually mounted on a support structure, e.g. support plate, of the shell of the mixing zone. The mixing zone is usually provided as a mixing compartment, e.g. tubular compartment, having a shell and a cavity for receiving liquid, with the static mixer arranged in the compartment. The support structure, e.g. support plate, is e.g. welded to the shell of the mixing compartment.

The plate (201) may be provided with a few small weep holes, in addition to the first aperture. The plate preferably delimits two parts of the mixing zone from each other.

The first aperture is provided with a circumferential flange (203) around the aperture. The flange extends in a direction perpendicular to the plate. The flange has a first end (203a) that is joined to the plate and an opposite second end (203b). The mixer further comprises a transversal element (204), generally a plate element, preferably with apertures or perforations. The transversal element extends substantially parallel to the plate and is joined to said second end of the circumferential flange. Preferably, the transversal element and the flange provide together a perforated mixing cup (208), i.e. a perforated cup-like structure around a first aperture. Preferably, the first aperture, flange and transversal element together define a zone for liquid flow from the first aperture to the plurality of second apertures, or vice versa; this zone is provided by a cavity of the mixing cup that is configured for receiving liquid in operation. Each cup is fluidly connected to a respective first aperture.

Preferably, the transversal element extends through the projection of the first aperture, and extends perpendicular to said projection. In operation, liquid flowing through the first aperture impinges on closed parts of the transversal element.

The circumferential flange (203) comprises a second aperture, highly preferably a plurality of second apertures (205). Each second aperture provides a smaller flow area than said first aperture. Hence, the first aperture provides a first flow area, i.e. area of the aperture, and the second apertures in the flange comprise a smaller second flow area. For instance, the second apertures have a smaller diameter than the first aperture. The flange may comprise at least two or at least three or at least 4 second apertures. In this way, the second apertures in the flange may in total provide for a flow area that is relatively large compared to the first area, thereby advantageously providing for a relatively small pressure drop over the static mixer. The second apertures permit for fluid flow through. The second apertures extend preferably substantially parallel to the flow direction (F), and preferably are angled to the first aperture, i.e. with an non-zero angle, preferably by 90°, such that liquid is diverted, i.e. changes flow direction, when flowing from the first to the second aperture or vice-versa through the zone defined by the flange, transversal element, and first aperture. For example, each flange is attached to only one first aperture and to only one transversal element. Suitably, the flange is attached at the first flange end to the entire perimeter of the first aperture.

The plurality of second apertures is e.g. angularly spaced over the flange, i.e. at different positions in the cross-section parallel to the plate (201), and preferably equiangularly spaced (i.e. in the cross-section parallel to the plate). The plurality of second apertures is e.g. at the same or different positions in the length direction of the flange from the first to the second flange end.

Figure 4:
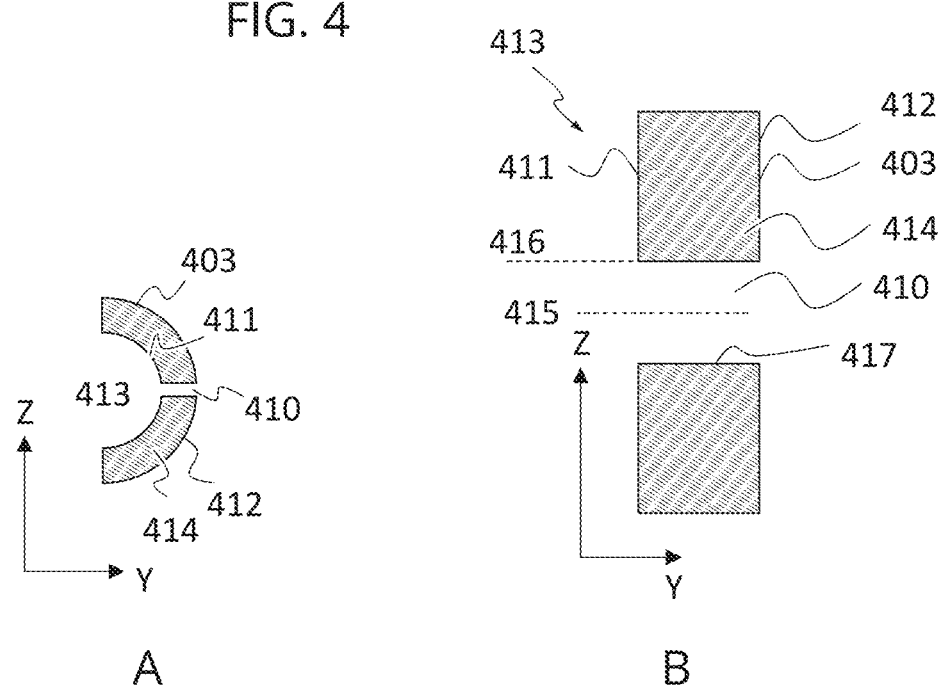
FIGS. 4A-4B illustrate schematic cross-sections of an example flange used in a first type static mixer preferably used in the invention.

The flange comprises a wall having an inner surface and an outer surface and a thickness, with the inner surface exposed to the cavity of the mixing cup. Each second aperture provides a channel (210) through the flange wall for liquid flow. The channel has a first channel opening in the inner surface of the wall and a second channel opening in the outer surface of the wall. The first and second channel opening are spaced apart in the transversal plane and the channel extends over a channel length in the transversal plane (plane parallel to the plate; Z-Y in FIG. 2, see FIG. 4B). The channel has a centreline that is preferably straight and preferably extends in the transversal plane.

Preferably, the transversal element, preferably plate element, comprises a third aperture (206) permitting for fluid flow, in addition to closed parts of the transversal element where the liquid impinges in operation. The third aperture provides a smaller flow area than said first aperture. Preferably the transversal element comprises a plurality of third apertures. The transversal element (204) comprises an impingement zone (207) which is e.g. a closed plate element. The third aperture preferably is configured for liquid flow in a direction parallel to the flow direction through the first aperture and preferably lies in a projection of the first aperture in the flow direction through the first aperture, or the first aperture preferably lies in in the projection of the third aperture in the flow direction of the third aperture. The transversal element may comprise a plurality of third apertures, that are preferably arranged in the same plane parallel to the plate.

The area of the impingement zone (207) in the cross-section of the transversal element in the direction parallel to the plate (201), i.e. the closed area of the transversal element (204) is preferably at least 30% or at least 50% of the flow area of the first aperture, preferably less than 90%. Hence, the total flow area of third apertures (206) in the transversal element is preferably at least 10% or at least 20%, and e.g. max. 70% of the flow area of the first aperture.

In this way, the transversal element (204) provides for a restriction of the liquid flow and ensures that the liquid is diverged to the second apertures (205) in the flange, respectively the liquid flows through the second apertures to the first apertures, and not exclusively straight through the third apertures (206) in the transversal element. This provides for mixing of the liquid in the cup-like structure by further division of the flow and by turbulence by diverging the liquid flow, i.e. a change of the flow direction, in particular by 90°.

The configuration with the flange and plurality of second apertures in the flange advantageously permit for a relatively small pressure drop by having a large total flow area of apertures in the transversal element and flange relative to the first aperture while still obtaining mixing by flow division and recombination and turbulence.

Preferably, the total flow area of the mixing cup, provided by the third and second apertures, is at least 50%, or at least 90% or at least 150% of the flow area of the respective first aperture, and optionally even more than 150%.

The plate (201) preferably comprises a plurality of first apertures, each provided with a mixing cup constituted by a flange and a transversal element. The first aperture and transversal element of a mixing cup preferably extend parallel and are spaced apart from each other in the direction perpendicular to the plate. Preferably, the transversal elements of a plurality of mixing cups of a single plate are aligned parallel to each other and are preferably level with each other. The flanges of the mixing cups of a plate are preferably aligned parallel with each other (centreline of the tubular flanges are aligned).

The combination of flange and adjoined transversal element provides for the (perforated) mixing cup (208); a flow-diverting plate may be provided with two or more types of mixing cups differing e.g. in the number and dimensions of the perforations and diameter of the flange. The plate (201) has a first planar surface and an opposite second planar surface, and preferably is provided with mixing cups only at the first planar surface (209). The first planar surface (and mixing cups) may be upstream or downstream with respect to the liquid flow direction. FIG. 2 shows the embodiment with downstream mixing cup (208). In operation of the static mixer with a plate with downstream mixing cups, liquid flows first through the first aperture (202) and then through the zone defined by the flange and transversal element and subsequently through the second and preferably third apertures. In operation of the static mixer with a plate with upstream mixing cups, the liquid flows first through the second and preferably third apertures, then through the zone, and exits the cup through the first aperture. Preferably, the cups provide risers that are attached to the plate, with generally vertically upward flow in the mixing zone.

The static mixer comprises a plate, typically a single flow-diverting plate, and the plate is preferably provided with a plurality of mixing cups. The diameter of the mixing cups (flange and first aperture) may be different for the mixing cups. Preferably, the plate is provided with a central mixing cup and a plurality of peripheral mixing cups arranged peripherally with respect to the central mixing cup, i.e. around the mixing cup, on the plate. Preferably, the flow area of the first aperture of the central mixing cup is larger than the flow area of the first aperture of the respective peripheral mixing cups. Preferably, the transversal element of the central mixing cup comprises two or more apertures, i.e. third apertures.

Figure 3:
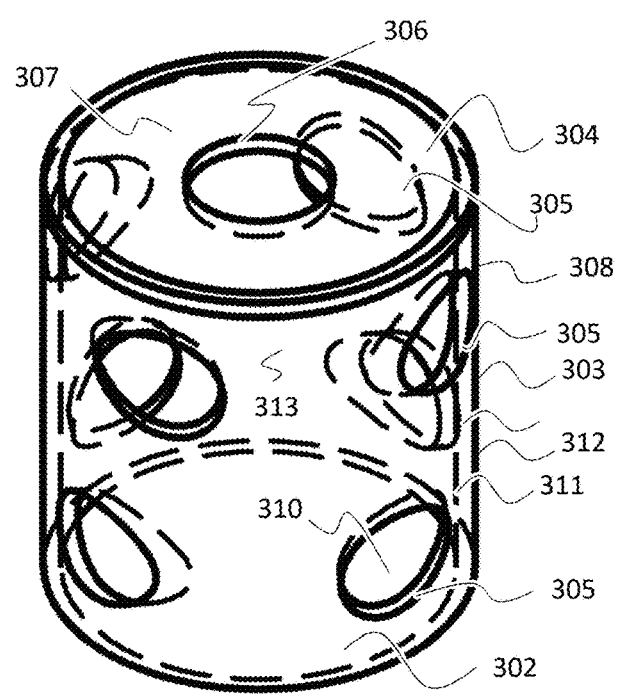
FIG. 3 shows an example mixing cup used for a first type static mixer for a mixing zone according to preferred embodiments of the invention.

FIG. 3 shows an example mixing cup used for a static mixer for a mixing zone according to the invention. Corresponding reference numbers are the same as in FIG. 2. The transversal element (304) comprises an impingement zone (307) which is e.g. a closed plate element. The transversal element (304) comprises a single third aperture (306). Two rows of second apertures (305) are shown, with in each row four apertures, the apertures being equiangularly spaced (i.e. at 90°), each second aperture being perpendicular to the first aperture (302). The mixing cup (308) defines a cavity (313) for receiving liquid in operation. The mixing cup acts as a manifold in operation (one inlet, plurality of outlets, or vice versa) in operation. The flange (303) is constituted by a wall (314) that has an inner surface (311) and an outer surface (312). The diameter of the second apertures (305) is e.g. 20 mm.

The mixing zone may comprise two or more of such static mixers with mixing cups; wherein the orientation (upstream or downstream mixing cups) can differ between the static mixers.

Preferably, the mixing zone comprises a first static mixer with a plate with upstream mixing cups, and with a second static mixer downstream of the first static mixer (in the general liquid flow direction), the second static mixer being provided with a plate with downstream mixing cups (mixing cups downstream of the plate); preferably with an intermediate static mixer, e.g. helical static mixer, between the first and second mixing cups static mixer; and preferably with a second helical static mixer between the second mixing cup static mixers and the tube bundle. In operation, liquid flows through the second apertures of the flanges of the first static mixer into the cavities of the cup of the first static mixer (the first static mixer being upstream) and, in the (downstream) second static mixer, from the cavity outward through the second apertures of the flange. This configuration is expected to provide that more volume of liquid is contacted well with surrounding liquid due to location of entrance/exits.

The second apertures may be referred to as second type apertures and the third apertures may be referred to as third type apertures. The second apertures may have sizes (diameters) that are the same as, or different than, the size (diameter) of the third apertures. The apertures indicate holes, openings or perforations in the corresponding element (plate, flange, respectively transversal element) permitting for liquid flow through the apertures.

The flange is preferably tubular, e.g. cylindrical and preferably has a diameter that is the same as the diameter of the (circular) first aperture. The second and third apertures are independently preferably circular.

In a preferred embodiment, the second apertures in the flange are configured to provide for diverging or converging swirling motion of the liquid in the plane parallel to the plate and/or the plane perpendicular to the vector or direction defined by the first and second end of the flange. This embodiment is used e.g. with a tubular flange.

Preferably, the second apertures provide for tangential inlets respectively outlets of the cavity, more preferably with a tubular flange.

Preferably, the second apertures, or at least one or more of the second apertures, are skewed holes or skew holes in the flange, viz. the second aperture is an aperture that is angled (has a non-zero angle) relative to a local normal of the flange at the position of the aperture, preferably has an oblique angle to said local normal. In other words, the second aperture has a non-zero angle relative to said local normal.

In particular, each second aperture is provided by a channel through the flange. The channel (310) is shown in FIG. 3.

FIGS. 4A-4B illustrate schematic cross-sections of an example flange used in a first type static mixer preferably used in the invention.

FIG. 4A shows a transversal cross-section of the flange through aperture 205a (corresponding references are the same as in FIG. 2), i.e. a cross section Z-Y through aperture 205a in FIG. 2.

As shown in FIG. 4A, the flange (403) is constituted by a wall (414) that has an inner surface (411) and an outer surface (412), for a cylindrical flange the inner and outer surface are curved in the transversal cross-section parallel to the plate. The inner surface (411) of the flange is exposed to the cavity (413) of the cup. The channel (410) provides the aperture. The channel (410) of FIG. 4A is not skewed.

FIG. 4B shows a magnified portion of FIG. 4A.

The individual channel (410) has a direction (415), in particular defined by the centreline of the channel, and the channel direction of an individual channel is parallel to the local normal (416) of the wall at the position of the second aperture since the second aperture is not skewed. The channel 410 corresponds to the aperture 205a in FIG. 2. The channel direction can be determined on the basis of the channel walls (417).

Figure 5:
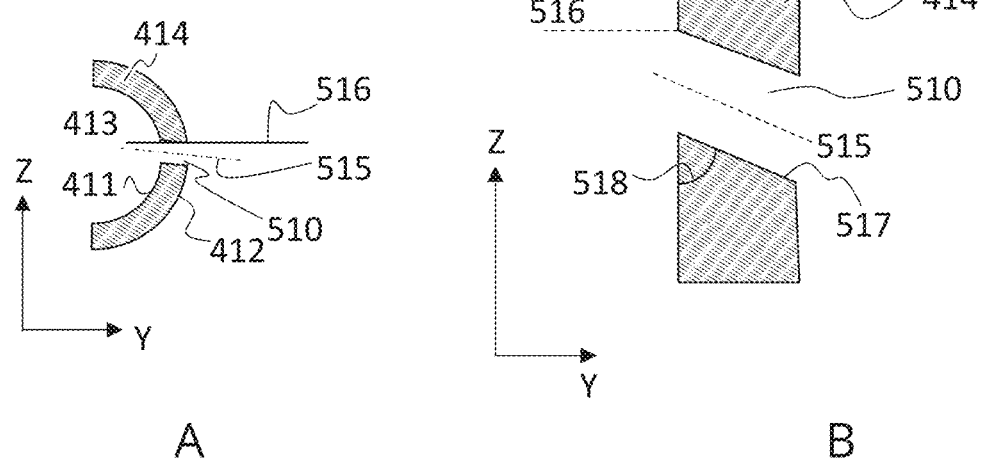
FIGS. 5A-5B schematically show cross-section of a preferred embodiment of the flange wherein the second aperture is skewed.

FIGS. 5A-5B schematically show a preferred modified version of the example flange of FIGS. 4A-4B wherein the channels are skewed, in particular are skewed in the transversal (Z-Y) cross section. Reference numbers are the same as in FIGS. 4A-4B unless otherwise indicated.

FIG. 5A corresponds to FIG. 4A. However, the channel (510) is skewed in the horizontal plane (transversal plane).

FIG. 5B is a magnified portion of FIG. 5A.

In this embodiment, the flange is modified in that the second aperture is skewed in the transversal (horizontal) plane (Z-Y). The channel of the aperture has a direction (515) (dashed), in particular defined by the centreline of the channel, and the channel direction of an individual channel is at an angle of a least 5° or at least 10°, usually less than 60° or less than 45°, to the local normal (516) of the wall at the position of the second aperture. This local normal is in particular defined by the direction of the vector perpendicular to the planar surface defined by the channel opening in the outer respectively inner surface of the wall, more in particular perpendicular to the channel opening in the inner respectively outer wall surface in the transversal cross-section through the channel. Preferably, the channel opening in the inner wall surface is parallel to the channel opening in the outer wall surface in the transversal cross-section through the channel. Preferably, the angle to the outer surface is used to determine the angle.

Preferably, the channel defines a bore hole or perforation through the flange wall (manufactured e.g. with drilling), and bore hole walls (517) are oblique, e.g. at angle (518) to the inner respectively outer surface of the wall at the channel opening that is not equal to 90°, e.g. at an angle of less than 85° or more than 95°. Preferably, the angle to the outer surface is used.

The channel direction (515) can be determined on the basis of the channel walls (bore hole walls) (417).

Accordingly, it can also be said that the skewed holes are drilled holes drilled with an offset of the drill to the centreline, the centreline being the projection of the centre of the flange in the transversal cross-section through the wall. Preferably, the offset is in the transversal plane, and in a view from the first to the second end of the flange, for all apertures of a cup to the same side of the outward projection of the centreline of the aperture, i.e. the projection outward from the outer surface of the flange, i.e. all to the right hand side or to the left hand side.

Preferably, the channels are skewed cooperatively relative to each other so as to impart a swirling motion to the liquid mixture.

Preferably, for an individual flange, the outward projection of the centreline of the channel of each second aperture in the flange, i.e. the projection (515) of the channel outward from the outer surface of the flange wall, lays in the transversal plane (Z-Y in FIG. 2; i.e. as in FIGS. 5A-5B), and in a view (in the X direction) from the first end of the flange (that is joined to the plate) to the second end of the flange, at the same side of the outward projection of the local normal (516) of the opening of the channel in the outer flange wall surface, e.g. on the left or on right hand side, for all second apertures of that flange.

Figure 6:
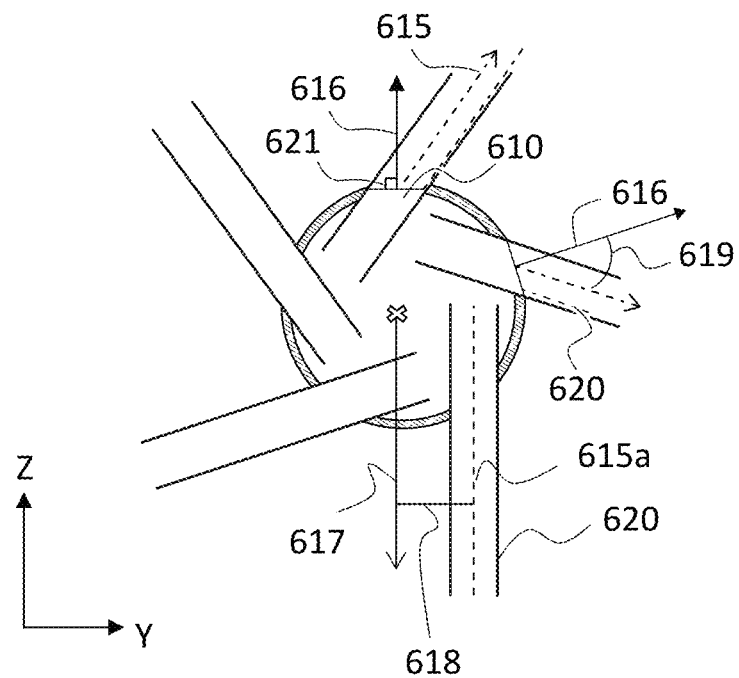
FIG. 6 shows a transversal cross-section of an example flange used in a first type static mixer preferably used in the invention.

FIG. 6 shows a transversal cross-section (Z-Y) of an example flange used in a first static mixer preferably used in the invention; with the outward projections as discussed.

The projections (615) of the centre lines of the channels (dashed), i.e. parallel to the walls of the channel, are, in the transversal plane, for all channels to the same side (i.e. to the right hand side) of the corresponding outward projections (616) of the local normal from the opening (aperture) (621) of the channel (610) in the outer surface of the flange wall. Preferably, the angle (619) between the projections of the channel projections (615) to the normal (616) is substantially the same for all apertures of a flange (e.g. less than 10° difference)

This contributes to creating effective swirling motion of the liquid, and hence good mixing, in particular for plates with downstream cups (with liquid flowing through the second apertures into the cup cavity in operation).

Generally, the outer surface is of the flange convex and preferably curved, the inner surface is concave and preferably curved.

FIG. 6 also illustrates the off-set (618) between the centreline (617) projecting from the centre of the flange in the transversal plane through the wall and the centreline (615a) of the borehole that is parallel to that centreline (617). Also shown are the projections of the channel walls (620) corresponding to a tool (drilling tool) that could be used to make the channels (610) as bore holes, with the drilling tool being off-set in the transversal plane (Z-Y plance). The projections (615) of the centre lines of the channels are parallel to the walls of the channel and hence parallel to the projections (620) of the channel walls.

Preferably, the flange is provided with a first circumferential row of second apertures proximate the liquid-diverting plate and a second circumferential row of second apertures distal to the plate, i.e. further removed from the plate than the first row. Preferably, the first row of second apertures is staggered with respect to the second row, i.e. the apertures of the first row are at a different position, around the circumference of the flange and/or in the transversal plane, than the apertures of the second row.

The static mix is preferably made of Ti or a Ti alloy.

The invention also provides the static mixer as such, e.g. the static mixer as such constituted by the plate with at least one mixing cup, preferably a plurality of mixing cups as described. The static mixer as such can be used in many types of chemical reactors where static liquid-liquid mixing is desired.

Embodiments of the invention pertaining to a reaction zone downstream of the shell-and-tube chamber comprising a gas redistributor, preferably a gas redistribution plate, are based on the judicious insight that gaseous $NH_3$ emissions at the gas/liquid separation unit are at least in part caused by disbalance of $NH_3$ and nitric acid in the tubes, in the sense of some tubes receiving excess $NH_3$ relative to the nitric acid in the liquid received by specifically that tube.

One cause of such disbalance can be imperfect mixing upstream of the tubes; in particular if some individual tubes receive liquid with a nitric acid concentration below the threshold NA concentration that corresponds to a molar ratio to the amount of $NH_3$ entering the tube below 1.0; that is to say a local nitric acid concentration that is lower than the threshold NA concentration which offsets the overall excess of nitric acid to $NH_3$. The amount of unreacted $NH_3$ at the tube outlets due to imperfect upstream mixing will generally be constant over the lifetime of the tubes.

A further, independent, cause is a size increase of the perforations (holes) in the tube walls due to corrosion and possibly erosion, considering the unreacted nitric acid in the tubes. This corrosion will occur at different rates for the individual perforations and tubes, resulting in an increased disbalance over the lifetime of the tube. Considering an individual tube with an enlarged hole or holes, more gaseous $NH_3$ will be admitted in this tube, and if the increased amount of $NH_3$ exceeds the threshold amount of $NH_3$ necessary to completely react nitric acid in the liquid received by the individual tube (even if this amount of nitric acid is nominally excess to $NH_3$ on the tube design) it will be unreacted at the outlet tube end. Similarly, considering an individual tube receiving liquid with a nitric acid concentration below the mentioned threshold concentration due to imperfect mixing in the upstream mixing zone, unreacted $NH_3$ will be present at the outlet tube end. The outlet tube ends of the tubes are spatially separated in the radial plane (cross section) and distributed in the radial plane. The unreacted $NH_3$ at the tube end of some tubes is unable to react with the liquid in its immediate vicinity, which originates from the same tube and which contains no unreacted nitric acid and needs to be contacted with the radially removed liquid from other tubes (e.g. tubes not having enlarged holes). In view of the overall excess of NA to $NH_3$ reaction unit, most tubes will have no unreacted NA at the tube outlet. The amount of unreacted $NH_3$ at the tube outlets will increase over the lifetime of the tubes due to this mechanisms and may put an upper limit on the time until replacement, or maintenance and inspection intervals.

To achieve complete conversion of $NH_3$ in the reaction zone downstream of the outlet tube ends, vigorous mixing of the fluid in the reaction zone is one possible approach; suggested by the post-mixing element 12a of AU654632B1. In such embodiment the aim is to provide static mixing with a sufficiently low coefficient of variation. However, this requires vigorous mixing, implying a relatively large pressure drop and complex large static mixers; factors which leave a desire for improvement.

A judicious insight of the present invention is that the unreacted $NH_3$ at the tube end of some tubes is present in the gaseous phase, because of the very low solubility of $NH_3$ in the liquid phase, i.e. the AN solution.

This can be used for radially redistributing the gaseous $NH_3$, i.e. by causing at least some gas/liquid separation and ensuring flow of gaseous $NH_3$ in a gas layer in the radial plane. In particular, a horizontal gas redistribution plate is provided in the reaction zone where in operation a gas layer or cushion is formed below the plate. The gas, i.e. unreacted $NH_3$, can move in the radial plane (transversal plane, i.e. horizontally in operation) in this horizontal gas layer; advantageously this transversal gas flow involves a relatively small dynamic pressure drop.

Figure 7:
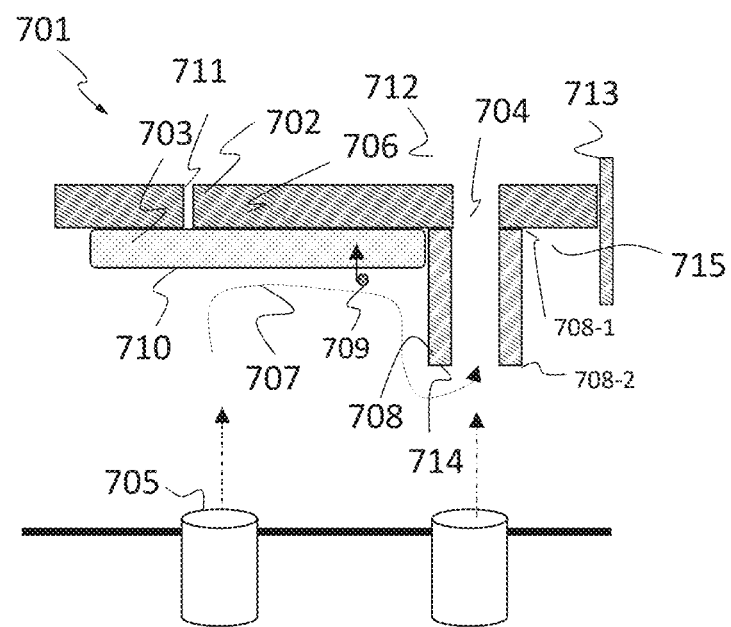
FIG. 7 schematically shows an example embodiment of the second type static mixer that is preferably used in the invention.

The general operation of the second type static mixer will now be discussed, using FIG. 7 as an illustrative, non-limiting example embodiment of the second type static mixer that is preferably used in the invention. The second type static mixer (701), also referred to as gas redistributor, comprises the horizontal gas redistribution plate (702). Note, for the second type static mixer as such, the gas redistribution plate can be described as a transversal plate. In operation, a gas layer or cushion (703) is formed below the plate. Even though the following discussion of the second type static mixer will refer to FIG. 7 for convenience, the second type static mixer is not thereby limited. Reference numbers in FIG. 7 are different than in FIG. 1-6.

At the same time, although some homogenization of the liquid is obtained when passing through liquid passageway(s) (704) of the plate, no extensive liquid mixing is necessary because of the overall nitric acid excess. In practice, the gas redistribution plate comprises a plurality of liquid passageways, i.e. apertures permitting for liquid flow. Rather, without wishing to be bound by way of theory, the gas/liquid separation removes small gas bubbles of $NH_3$ from a surrounding pocket of liquid that lacks unreacted NA and redistribute the gas in the liquid which overall contains unreacted NA.

In particular, without wishing to be bound by way of theory, liquid from a tube outlet (705) (not part of the second static mixer) flows upward in operation, and is diverted by a liquid-diverting part (706) of the gas redistribution plate, in particular a part of the gas redistribution plate that blocks liquid flow and that overlaps the projection from the tube outlet, to flow horizontally (707) along the plate, hence broadly speaking the liquid impinges on the gas redistribution plate part. The liquid is then diverted, i.e. forced to change direction, downward by flange (708) of a liquid passageway of the gas redistributor, flows along the flange and around the edge (714) of the flange, and subsequently upward through the liquid passageway. The reaction zone, preferably reaction chamber, comprises a cavity for fluid to flow as described around the edge (714) of the flange into the flange or duct.

If the tube has unreacted $NH_3$ at the outlet, the gaseous $NH_3$ flows with the liquid upward, and during the horizontal flow of the liquid below the plate, the $NH_3$ gas bubbles (709) may preferentially flow upward by their buoyancy, and in operation a gas layer or cushion (703) is formed below the gas redistribution plate. The gas bubbles may reach the gas/liquid interface (710) of the gas layer thereby separating from the liquid phase. A relatively low velocity of the liquid below the plate and sufficient radial (horizontal) spacing between the liquid passageways, i.e. relatively large dimensions of the gas-diverting parts of the plate, contributes to this gas/liquid separation. It is noted that the gas/liquid separation mechanism is not dependent on turbulence. Accordingly, a larger surface area of the gas redistributor is advantageous to reduce liquid velocities and increase radial spacing between the liquid passageways. It is noted that a gas layer will form more completely especially when the fraction of unreacted $NH_3$ at the tubes outlet is higher (e.g. over the lifetime of the tubes), i.e. especially when the measures to ensure complete conversion of $NH_3$ at the reaction unit outlet become more important. At a very low unreacted $NH_3$ level at the tube outlets, e.g. with new tubes, one or more gas cushions may form under the gas redistribution plate which can be sufficient to ensure complete conversion of the low amount of unreacted $NH_3$.

Gas from the gas layer or cushion is admitted into a liquid layer above the plate through perforations (711) (i.e. gas vent holes) in the plate, which perforations distributed in the transversal plane, and reacts with the unreacted nitric acid in the liquid layer. The perforations are sized to restrict the gas flow to maintain the gas layer below the plate, e.g. maintain a sufficient pressure drop over the perforations to prevent the gas from readily exiting through the perforations. For a constant concentration of unreacted $NH_3$ in the total liquid from the tubes (at the tube outlets), the gas layer thickness can be maintained constant. The gas layer thickness may increase over the lifetime of the tubes with an increasing concentration unreacted $NH_3$ at the tube outlets. The gas vent holes are e.g. able to discharge gaseous unreacted $NH_3$ up to a gas flow increases by 50% over the lifetime of the tube bundle, after which any further increase of the unreacted $NH_3$ concentration at the tube outlets is mitigated by an increased gas flow through the liquid passageways.

The reaction zone comprises a space (712) for holding a liquid layer above the plate.

Preferably, the converging part of the reaction unit is provided downstream of this space, e.g. above this space. Preferably, no converging part is provided between the shell-and-tube chamber and the gas redistributor. Preferably, the gas redistribution plate has the same diameter as the shell of the shell-and-tube chamber, and a larger diameter than the mixing zone. Preferably, the gas redistribution plate has at least 60% or at least 80%, or at least 100% of the radial surface area of the shell-and-tube chamber (tubes and shell space in total), and a larger radial surface area or flow area than the mixing zone. Preferably, the diameter of the gas distribution plate is at least 80% or at least 90%, more preferably at least 100% of the diameter of the shell-and-tube chamber (shell). The surface area ratio between the flow area of the reaction zone directly downstream of the tube outlets, and/or of the part of the reaction zone directly upstream of the gas redistributor, to the cross-sectional flow area of the tube bundles (tubes in total) is typically at least 1.5, or at least 2, e.g. up to 5. This is schematically illustrated in FIG. 1 as well.

The relatively large surface area of the gas redistribution plate (or the reaction zone directly upstream of it), compared to the flow surface area of the tube bundle, provides for lower fluid velocities at the gas redistributor which improves gas/liquid separation by buoyancy of the gas.

A relatively low liquid velocity in the fluid directly upstream (below) the gas redistributor is hence advantageous for effecting gas/liquid separation.

Gas hold-up to form a radially extending gas layer is provided by the horizontally and radially extending gas distribution plate, especially the impingement parts of the plate where upward fluid flow is blocked, in combination with the perimeter flanges of the liquid passageways extending vertically downward in operation normally beyond the gas/liquid interface, such that gas from the gas layer cannot exit horizontally into the liquid passageways; subject to the operation of the preferred notches. The gas redistribution plate is preferably sealed at the perimeter by the shell (713) (wall) of the reaction zone.

Advantageously, the use of the gas redistributor thereby allows for less frequent replacement of the tubes (or less frequent tube plugging), and lower maintenance and inspection costs, because even if a tube suffers from corrosion or erosion of the perforations and enlargement of one or more of the perforations, the resulting disbalance of $NH_3$ is addressed by the gas redistributor.

It is observed that the higher fluid velocity of the fluid in the liquid passageway(s) of the gas redistributor, the turbulence caused by liquid flowing around the edge of the flange, may promote that any gaseous unreacted $NH_3$ contained in effluent flowing from a tube directly to a passageway without impinging on the gas redistribution plate (i.e. unreacted $NH_3$ from a tube straight below the liquid passageway) may react with unreacted nitric acids from effluent from other tubes. e.g. when passing through the channel defined by the flange of the liquid passageway.

The gas redistribution plate is preferably arranged straight above the tube and preferably directly above the tubes, i.e. in the upward projection of the tubes.

The second type static mixer (701) comprises a horizontal gas redistribution plate (702) provided with a liquid passageway (704), e.g. an aperture, and a gas vent hole (711). The liquid passageway may also be provided as an annular gap between the plate and the shell (713), this annular gap being provided with a flange as discussed.

Preferably, the plate comprises a plurality of first apertures and a plurality of second apertures, the second apertures being smaller (smaller diameter) than the first apertures, wherein the first apertures are liquid passage ways and the second apertures are gas vent holes.

The diameter of the gas vent holes is preferably less than 8 mm, more preferably less than 5 mm.

The gas redistribution plate (702) is, except for the liquid passageways, typically closed for at least 95% or at least 99%. Hence, the total flow area of the gas vent holes is preferably less than 1.0% or less than 0.5% of the surface area of the plate minus the total flow area of the liquid passageways. Thereby, the gas layer or cushion is maintained under the plate in operation.

Each liquid passageway is provided with a flange (708), i.e. a vertical rim, e.g. a tubular duct wall.

The flange (708) extends downward from a perimeter of the liquid passageway (704), e.g. by at least 1 cm, at least 2 cm, or at least 5 cm. In particular, the flange is sealingly attached or joined to the plate (702), e.g. welded to the to the plate (702) or the flange and to the plate (702) are provided as a unitary piece, in particular joined in a sealing manner around the entire perimeter or circumference of the liquid passageway (704). This attachment prevents fluid flow into the duct defined by the flange other than around the edge (714) of the flange.

The flange (708) (also called duct) hence has a first end (708-1) attached to, or joined with, the plate and a (free) second end (708-2) that provides and edge (714). The flange provides a duct for liquid, with liquid flowing upward through the duct in operation. The duct is at the first end attached to or joined with the plate, e.g. welded, preferably without apertures between the first end and the plate, and provides an edge at the opposite second end. In operation, liquid flows along the convex outer surface of the duct or flange downward (convex in the transversal plane) and around the edge provided by the second duct end, and subsequently up through the duct. The ducts may be referred to as riser ducts. The length of the duct in vertical direction is preferably at least 1.0 cm, or at least 2.0 cm, or at least 5 cm, e.g. less than 20 cm. The plate and flanges together provide an interstice (715) configured for collecting gas from the outlet tube ends below the plate, i.e. a space for the gas layer or cushion to form. The interstice is suitably further delimited by the shell (713) such that the interstice has a vertical wall around the entire perimeter of the interstice, which wall extends downward from the plate and seals of the interstice for horizontal flow to a liquid plate over the gas layer thickness. Gas exit through the gas vent holes is limited by the small flow area of the gas vent holes. Preferably, the total flow area of the gas vent hole or holes in a plate, is less than 5% of the total flow area of the liquid passageways in the gas redistribution plate preferably less than 1.0% thereof or even less than 0.1% thereof (flow area e.g. in $mm^2$).

Preferably, the plate is provided with a plurality of flanges, also called ducts (708) and liquid passageways (704). The number of ducts is e.g. the same as the number of tubes of tube bundle.

The orientation of the ducts can be the same (parallel to each other) or different. The orientation of the ducts can be the same or different from the orientation of the tubes.

For example, the total flow area (area in horizontal cross section) of the liquid passageways is optionally is max. 60% or e.g. max. 50% the surface area of the horizontal plate.

Preferably, the total flow area (area in horizontal cross section) of the liquid passageways is at least 80% or at least 90%, e.g. up to 120%, e.g. about 100% of the total flow area of the tubes of the tube bundle. This flow area of the liquid passageways may provide for an advantageous low pressure drop over the gas redistributor.

Figure 8:
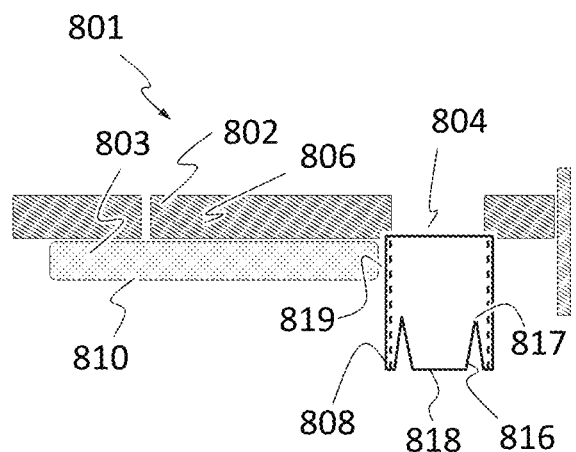
FIG. 8 illustrates an example embodiment of a flange of the second type static mixer.

FIG. 8 illustrates an example embodiment of a flange (808) of the second type static mixer (801), with such a notch (816). Reference numerals correspond to FIG. 7.

Preferably, the flange or duct (808) comprises an opening (816), e.g. an aperture or notch, in a distal part of the flange, distal from the plate (802); e.g. comprises a plurality of such openings (notches, apertures).

For example, the open area of the flange, i.e. fraction of the flange in the transversal (horizontal) cross-section that is open for fluid flow, gradual increases in the direction from plate (802) to the edge (818) (i.e. from the first end to the second end, with the flange attached to the plat at the first end). Preferably, the notch (816) is tapered and converging in the direction from flange edge to plate. Preferably, the length of the notch in the vertical direction is at least 10 mm or at least 20 mm.

Preferably, a part of the flange that is proximal to the plate (819), which part is at least 25% of the flange length (dimension in vertical direction), is free of openings. The height of this part (819) (dimension in vertical direction) is sufficient to maintain a desirable thickness (dimension in vertical direction) of the gas layer (803). When the gas flow rate from the tubes increases over the lifetime of the tubes, the thickness of the gas layer increases, until the gas/liquid interface (810) reaches the tip (817) of the notches (816) or more generally an opening. The gas can then exit through the notch and through the liquid passageway (804). Compared to a flange without the notch, a gas surge is avoided that could occur when the interface reaches the flange edge (818) without the notch. Such gas surge could cause irregularities in the operation of the reactor and reaction unit. Moreover, the preferably gradual increase in the notch area with increasing gas layer thickness, may provide a gradual increase in gaseous $NH_3$ in the outlet of the reactor and vapor outlet of the reaction unit, which can be noticed timely. Hence, the notches or corresponding openings in the flange provide for improved stability of the process over the lifetime of the tubes.

Figure 9:
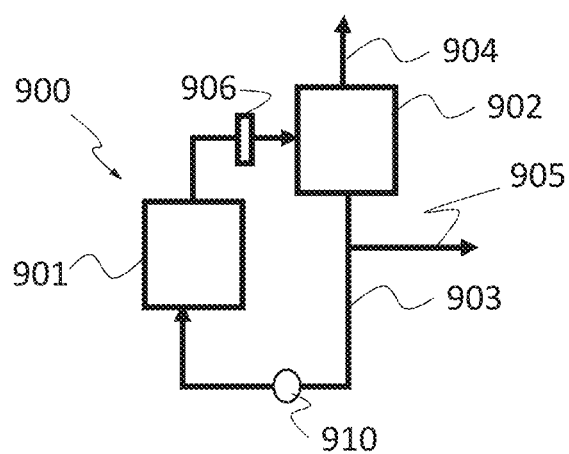
FIG. 9 schematically illustrates an example reactor according to the invention.

FIG. 9 schematically illustrates an example reactor (900) according to the invention. The reactor comprises the reaction unit (100; 901) according to the invention, and further comprises a gas/liquid separation zone (902) that in operation receives effluent from the reaction unit (901). The rector comprises a liquid flow line (903) from said separation zone to an inlet of the reaction unit for recirculation of ammonium nitrate solution to said first inlet of the inlet zone, a gas outlet (904) for gas from the separation zone, and a liquid outlet (905) for product AN solution from the separation zone. The reactor comprises a pressure reduction means (906), e.g. a restriction orifice or valve (pressure reducing valve), preferably a restriction orifice, between the reaction zone and the gas/liquid separation zone. The reactor also comprises a pump (910) in the liquid flow line for recirculated AN solution.

The invention also pertains a process for the production of ammonium nitrate by neutralization of aqueous nitric acid with gaseous $NH_3$ carried out in a reaction unit according the invention or a in a reactor according to the invention. All preferences for the operation of the reaction unit and reactor apply for corresponding process steps of the process. Preferably, the process comprising supplying aqueous nitric acid and gaseous $NH_3$ through the respective inlets, and recycling ammonium nitrate through the recycle flow line. Preferably, the process involves maintain a gas layer or gas cushion below the gas redistribution plate of the second type static mixer in the reaction zone.

The invention also provides a static mixer, i.e. a t mixing unit, that comprises flow-diverting plate which extends in a transversal direction perpendicular to the general liquid flow direction in the mixing zone and wherein in operation liquid impinges on the flow-diverting plate; a first aperture in the flow-diverting plate; a circumferential flange around the first aperture, wherein said flange extends perpendicular to the plate and has a first end that is joined to the plate and an opposite second end; and a transversal element, extending substantially parallel to the plate and joined to said second end of the circumferential flange; such that the transversal element and the flange together provide a cup-like structure around the first aperture; wherein the circumferential flange comprises a plurality of second apertures, wherein each second aperture provides a smaller flow area than said first aperture. All preferences and details mentioned in connection with the first type static mixer of the reactor apply equally to the static mixer as such. The static mix is preferably made of Ti or a Ti alloy.

The invention also provides the gas redistributor as such. All preferences and details mentioned in connection with the second type static mixer of the reactor apply equally to the gas redistributor as such.

Bara indicates bar absolute. Phrases such as, e.g., usually, typically, and frequently indicate features that are used in many embodiments but are not mandatory. The phrase "such as" indicates an example. The term 'or' indicates a non-exclusive or, e.g. a phrase "A or B" permits embodiments with both A and B unless otherwise stated.

The use of the phrase 'second type static mixer' does not imply that the first type static mixer must be present. The first and second type static mixer can also (alternatively) be referred to as a static mixer in the mixing zone respectively in the reaction zone.

The invention claimed is:
1. A reaction unit for the production of ammonium nitrate by neutralization of aqueous nitric acid with gaseous $NH_3$, the reaction unit comprising:
  an inlet zone comprising a first inlet for a stream of recirculated ammonium nitrate solution and a second inlet for the aqueous nitric acid;
  a mixing zone located downstream of said inlet zone, said mixing zone comprising a first type static mixer adapted to mix the recirculated ammonium nitrate solution with the aqueous nitric acid to form a liquid mixture;
  a shell-and-tube chamber comprising tube bundle and a shell space wherein the shell space comprises an inlet for gaseous $NH_3$, wherein a tube of the tube bundle has a tube wall, an inlet tube end and an outlet tube end and is configured for receiving the liquid mixture from the mixing zone through the inlet tube end, and comprises perforations in the tube wall to allow gaseous $NH_3$ from the shell space to enter the tube; and
  a reaction zone downstream of the outlet end of the tube, wherein said first type static mixer in the mixing zone upstream of the tube bundle comprises:
  a flow-diverting plate which extends in a transversal direction perpendicular to the general liquid flow direction in the mixing zone and wherein in operation liquid impinges on the flow-diverting plate;

a first aperture in the flow-diverting plate, a circumferential flange around the first aperture, wherein said flange extends perpendicular to the plate and has a first end that is joined to the plate and an opposite second end; and a transversal element, extending substantially parallel to the plate and joined to said second end of the circumferential flange; such that the transversal element and the flange together provide a cup-like structure around the first aperture;

wherein the circumferential flange comprises a plurality of second apertures, wherein each second aperture provides a smaller flow area than said first aperture.

2. A reactor comprising the reaction unit according to claim 1, and a gas/liquid separation zone receiving an effluent from the reaction unit, a liquid flow line from said separation zone to an inlet of the reaction unit for recirculation of ammonium nitrate solution to said first inlet of the inlet zone;

a gas outlet for gas from the separation zone; and a liquid outlet for product AN solution from the separation zone.

3. The reactor according to claim 2, wherein the reactor comprises a pressure reduction means, between the reaction zone and the gas/liquid separation zone; and a pump in the liquid flow line for recirculated AN solution.

4. The reactor according to claim 3, wherein pressure reduction means is a restriction orifice or valve between the reaction zone and the gas/liquid separation zone.

5. The reaction unit according to claim 1, wherein the transversal element comprises a third aperture, wherein the third aperture provides a smaller flow area than said first aperture.

6. The reaction unit according to claim 5, wherein the transversal element comprises a plurality of third apertures.

7. The reaction unit according to claim 1, wherein the total flow area of the apertures in the flange and in the transversal element is at least 80% of the flow area of the first aperture.

8. The reaction unit according to claim 7, wherein the total flow area of the apertures in the flange and in the transversal element is at least 100% of the flow area of the first aperture.

9. The reaction unit according to claim 1, wherein the transversal element and the flange together provide a perforated mixing cup.

10. The reaction unit according to claim 1, wherein the second apertures in the flange are configured to provide for a swirling motion of the liquid mixture in the transversal plane parallel to the plate, which swirling motion is diverging or converging.

11. The reaction unit according to claim 1, wherein the second aperture is a skewed hole in the flange, wherein the second aperture is an aperture that is at a non-zero angle relative to a local normal of the flange at the position of the second aperture.

12. The reaction unit according to claim 1, wherein the reaction zone comprises a second type static mixer.

13. A process for the production of ammonium nitrate by neutralization of aqueous nitric acid with gaseous $NH_3$ carried out in a reaction unit according to claim 2.

14. A reaction unit for the production of ammonium nitrate by neutralization of aqueous nitric acid with gaseous $NH_3$, the reaction unit comprising:

an inlet zone comprising a first inlet for a stream of recirculated ammonium nitrate solution and a second inlet for the aqueous nitric acid;

a mixing zone located downstream of said inlet zone;

a shell-and-tube chamber comprising tube bundle and a shell space wherein the shell space comprises an inlet for gaseous $NH_3$, wherein a tube of the tube bundle has a tube wall, an inlet tube end and an outlet tube end and is configured for receiving the liquid mixture from the mixing zone through the inlet tube end, and wherein said tube comprises perforations in the tube wall to allow gaseous $NH_3$ from the shell space to enter the tube; and a reaction zone downstream of the outlet end of the tube, wherein the reaction zone comprises a static mixer, wherein the static mixer is provided downstream of the outlet tube ends, wherein the reaction zone has a generally vertically upward flow direction, and wherein the static mixer comprises:

a horizontal gas redistribution plate provided with a liquid passageway and a gas vent hole, wherein the liquid passageway is provided with a flange extending downward from a perimeter of the liquid passageway, wherein the plate and flange together provide an interstice configured for collecting gas from the outlet tube ends in a gas layer or cushion below the gas redistribution plate.

15. A reactor comprising the reaction unit according to claim 14, and a gas/liquid separation zone receiving an effluent from the reaction unit, a liquid flow line from said separation zone to an inlet of the reaction unit for recirculation of ammonium nitrate solution to said first inlet of the inlet zone;

a gas outlet for gas from the separation zone; and a liquid outlet for product AN solution from the separation zone.

16. The reactor according to claim 15, wherein the reactor comprises a pressure reduction means, between the reaction zone and the gas/liquid separation zone; and a pump in the liquid flow line for recirculated AN solution.

17. The reactor according to claim 16, wherein the pressure reduction means is a restriction orifice or valve between the reaction zone and the gas/liquid separation zone.

18. The reaction unit according to claim 14, wherein the horizontal gas redistribution plate comprises a plurality of said liquid passageways and a plurality of said gas vent holes, wherein the total flow area of the gas vent holes is less than 5% of the total flow area of the liquid passageways, and wherein each of said liquid passageways of the horizontal gas redistribution plate is provided with one of said flanges.

19. The reaction unit according to claim 18, wherein the flanges each extend at least 5 cm down from the gas redistribution plate.

20. The reaction unit according to claim 18, wherein the total flow area of the gas vent holes is less than 1% of the total flow area of the liquid passageways.

21. The reaction unit according to claim 14, wherein the flange comprises an opening, in a distal part of the flange, wherein the distal part is arranged distal from the plate.

22. The reaction unit according to claim 21, wherein the opening is an aperture or notch in a distal part of the flange.

23. The reaction unit according to claim 14, wherein the mixing zone located downstream of said inlet zone comprises an additional static mixer adapted to mix the recirculated ammonium nitrate solution with the aqueous nitric acid to form a liquid mixture, wherein said additional static mixer in the mixing zone upstream of the tube bundle comprises:

a flow-diverting plate which extends in a transversal direction perpendicular to the general liquid flow direction in the mixing zone and wherein in operation liquid impinges on the flow-diverting plate;
a first aperture in the flow-diverting plate,
a circumferential flange around the first aperture, wherein said flange extends perpendicular to the plate and has a first end that is joined to the plate and an opposite second end; and
a transversal element, extending substantially parallel to the plate and joined to said second end of the circumferential flange; such that the transversal element and the flange together provide a cup-like structure around the first aperture;
wherein the circumferential flange comprises a plurality of second apertures, wherein each second aperture provides a smaller flow area than said first aperture.

24. A process for the production of ammonium nitrate by neutralization of aqueous nitric acid with gaseous $NH_3$ carried out in a reaction unit according to claim 8.

* * * * *